R. CAIRNS.
Improvement in Gear-Cutting Machines.
No. 130,188. Patented Aug. 6, 1872.
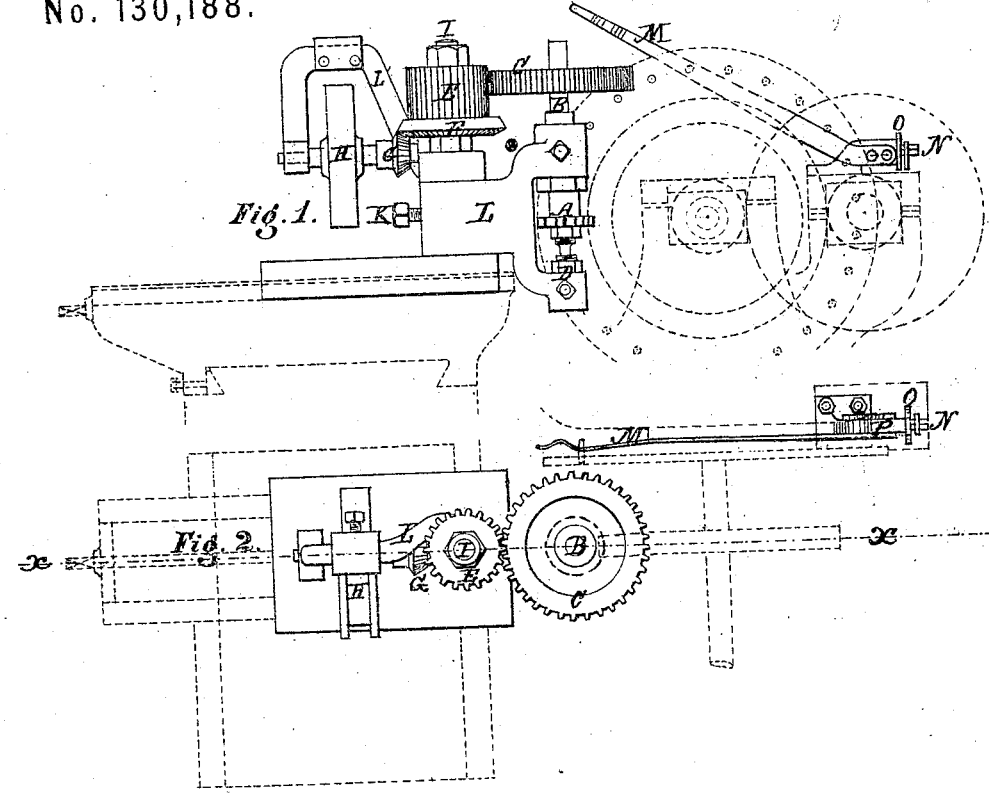
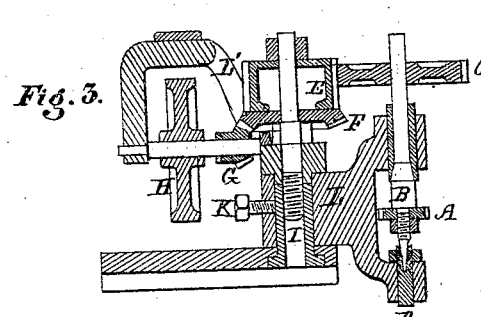
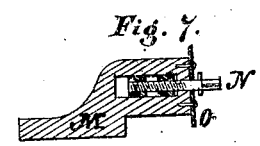
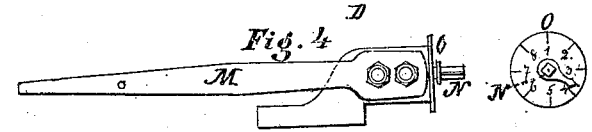
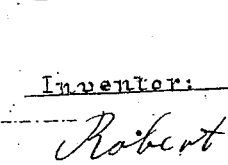

UNITED STATES PATENT OFFICE.

ROBERT CAIRNS, OF WATERBURY, CONNECTICUT.

IMPROVEMENT IN GEAR-CUTTING MACHINES.

Specification forming part of Letters Patent No. 130,188, dated August 6, 1872.

Specification describing certain Improvements in Gear-Cutting Attachment for Lathes, invented by ROBERT CAIRNS, of Waterbury, county of New Haven and State of Connecticut.

The object of my invention is the construction of a simple and efficient machine for cutting small spur and bevel gears in such manner that the same can be readily attached to a common lathe as a substitute for, and thereby dispensing with, the use of an expensive gear-cutting engine; the nature of which consists of a cutter fixed on an adjustable spindle, which also carries a gear which meshes into a carrying-gear driven by bevel-gears, one of which is on the driving-shaft, carried by the driving-pulley, said carrying-gear and pulley partially rotating around the clamping-screw post, the whole being set in a proper framework and clamped to the tool-carriage of the lathe, as shown in the drawing, of which—

Figure 1 is an elevation of the gear-cutting machine attached to a lathe, the head-stock, index-plate, blank gear, and tool-carriage of the lathe being represented in dotted lines; Fig. 2, a top view of same; Fig. 3, a vertical section on line $x\ x$ of Fig. 2; Figs. 4, 5, 6, and 7, views of the index-pointer.

In the drawing, A is the cutter; B, the adjustable spindle, carrying the gear C, and sustained in a step, D. E is the carrying-gear, its base being a bevel-gear, F, which is driven by the bevel-gear G on the shaft of the driving-pulley H. This bevel-gear G, and also the driving-pulley are supported by the arm L', and swing partially around the clamping-post I for convenience in attaching the driving-belt, and when adjusted is made fast by the stud-bolt and set-screw K. L is the framework of the machine, attached to the tool-carriage or other part of the lathe, as may be desired. M is the index-pointer, attached to the head-stock of the lathe, the same being provided with an adjusting-screw, N, small index-dial O, and scale P for adjusting the pointer M to the holes in the index-plate, as shown in the drawing.

What I claim is—

The gear-cutting machine herein described, consisting mainly of frame L, arm L', stud-bolt I, pulley H, the several pairs of gear-wheels, the mandrel B, and the index-pointer, all constructed and combined substantially as specified.

ROBERT CAIRNS.

Witnesses:
WM. A. HOLLMAN,
JAMES M. BIRRELL.